(12) United States Patent
Kujda

(10) Patent No.: US 9,104,775 B2
(45) Date of Patent: Aug. 11, 2015

(54) METHOD FOR PRESENTING A WEB PAGE

(75) Inventor: David P. Kujda, Santa Monica, CA (US)

(73) Assignee: Yahoo! Inc., Sunnyvale, CA (US)

(*) Notice: Subject to any disclaimer, the term of this patent is extended or adjusted under 35 U.S.C. 154(b) by 1507 days.

(21) Appl. No.: 11/873,373

(22) Filed: Oct. 16, 2007

(65) Prior Publication Data

US 2009/0100356 A1    Apr. 16, 2009

(51) Int. Cl.
*G06F 17/30* (2006.01)
*G06F 17/21* (2006.01)

(52) U.S. Cl.
CPC ........ *G06F 17/30899* (2013.01); *G06F 17/212* (2013.01)

(58) Field of Classification Search
CPC .......................... G06F 17/30899; G06F 17/212
USPC .......................... 715/788, 790, 793
See application file for complete search history.

(56) References Cited

U.S. PATENT DOCUMENTS

| 6,593,944 | B1 * | 7/2003 | Nicolas et al. | 715/744 |
| 6,976,226 | B1 * | 12/2005 | Strong et al. | 715/788 |
| 7,272,790 | B2 * | 9/2007 | Fabritius | 715/209 |
| 7,302,637 | B1 * | 11/2007 | Maguire | 715/210 |
| 2007/0038718 | A1 * | 2/2007 | Khoo et al. | 709/206 |

* cited by examiner

*Primary Examiner* — Ajay Bhatia
*Assistant Examiner* — Phoebe Pan
(74) *Attorney, Agent, or Firm* — Martine Penilla Group, LLP

(57) ABSTRACT

The present invention provides a method for presenting a web page which presents a preview of a web page when loading the web page. The preview may be a smaller version of the web page, which is fitted to be completely contained in one screen. The preview may include a smaller version of each module on the web page, and may be expanded to a web page in full size when the loading is finished. If a user expresses interests in one module, that module may be loaded and displayed first.

20 Claims, 5 Drawing Sheets

METHOD FOR PRESENTING A WEB PAGE

CROSS REFERENCE TO RELATED APPLICATIONS

This application is related to U.S. patent application Ser. No. 11/873,381, filed on the same day as the instant application and entitled "Content Navigation Method and User Interface," which is hereby incorporated by reference in its entirety.

BACKGROUND

1. Field of the Invention

The present invention relates generally to the Internet, and more particularly to a method of providing a preview of content on a web page.

2. Description of Related Art

The Internet has become a major information resource to users. To attract more users, content providers are putting more and more information on their websites, causing the quantity and complexity of content of a web page to be significantly increased. As one consequence, it may take longer to load a web page. Since existing methods do not display anything on the screen until the loading of the web page is finished, users have to spend more time waiting.

As another consequence, web pages are becoming longer, with more modules stacked thereon. Users might not think to scroll down to see content on a lower portion of a web page, thus missing significant amount of information and services provided by the web page. When a user does scroll down, the upper portion of the web page may move out of the screen, so that the user cannot see all the content on the web page at one time. Besides, constantly operating a mouse to scroll up and down the web page is inconvenient, time consuming and tiring, especially when the user does not know in advance whether he/she is interested in the content below the fold.

Therefore, it would be desirable to provide a more user friendly web page presentation method, which presents a preview of a long web page when loading the web page.

BRIEF DESCRIPTION OF THE DRAWING FIGURES

Embodiments of the present invention are described herein with reference to the accompanying drawings, similar reference numbers being used to indicate functionally similar elements.

DETAILED DESCRIPTION

The present invention provides a method for presenting a web page which presents a preview of a web page when loading the web page. The preview may be a smaller version of the web page, which is fitted to be completely contained in one screen. The preview may include a smaller version of each module on the web page, and may be expanded to a web page in full size when the loading is finished. If a user expresses interests in one module, that module may be loaded and displayed first. Accordingly, the user may be provided with the overall structure of the web page, and may easily jump to the portion of the web page in which he/she is interested. With the preview of the web page, the user may not miss content in which he/she is interested, and may not waste time on content in which he/she is not interested. It also saves the user physical effort in scrolling up and down a long web page. The invention could be carried out by computer-executable instructions, such as program modules. Advantages of the present invention will become apparent from the following detailed description.

Figure 1:
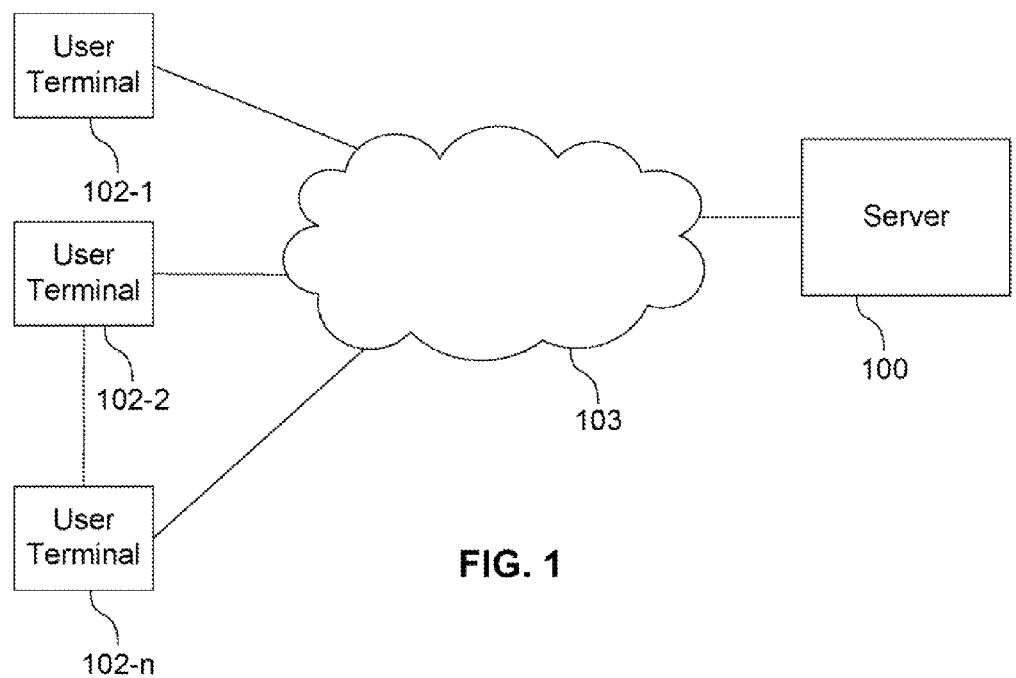
FIG. 1 illustrates an exemplary environment in which the web page presentation method of the present invention may be used.

FIG. 1 illustrates an exemplary environment in which the web page presenting method of the present invention may be used. As shown, a server 101 may communicate over a network 103 with a number of user terminals 102-1, 102-2, . . . 102-n. The server 101 may be a computer system, which may include one or more of a screen, an input device, a processing unit, a system memory, and a system bus coupling various components in the computer system.

The user terminals 102 may be personal computers, handheld or laptop devices, microprocessor-based systems, set top boxes, or programmable consumer electronics. Each user terminal may have a browser application configured to receive and display web pages, which may include text, graphics, multimedia, etc. The web pages may be based on, e.g., HyperText Markup Language (HTML) and a wireless application protocol (WAP).

Figure 2:
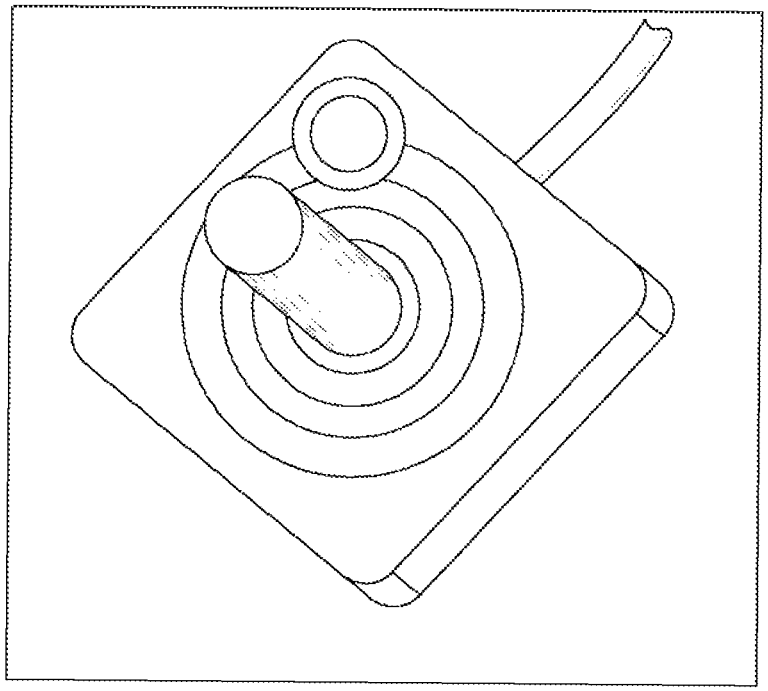
FIG. 2 illustrates an existing user interface.
Figure 2:
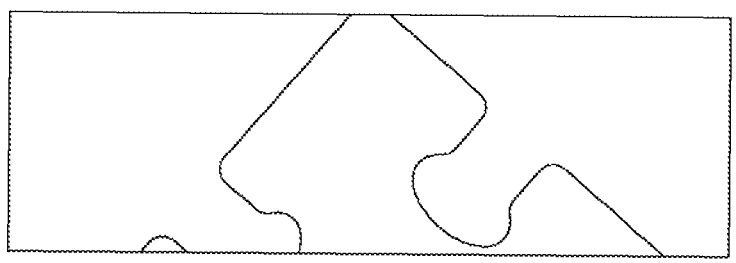

FIG. 2 illustrates an existing user interface. A web page 200 may have five modules, each of which may represent a category of games, e.g., Arcade games, Puzzle games, Card games, Word games and Board games. The visual representation of each module (or category) may include an icon for the category and links to the top 3 best selling games in this category. As shown, the screen may be only big enough to show the module for the category Arcade games and part of the module for the category Puzzle games. Users may not know that the web page has other modules, and may not know what they are, or what they contain.

Figure 3A:
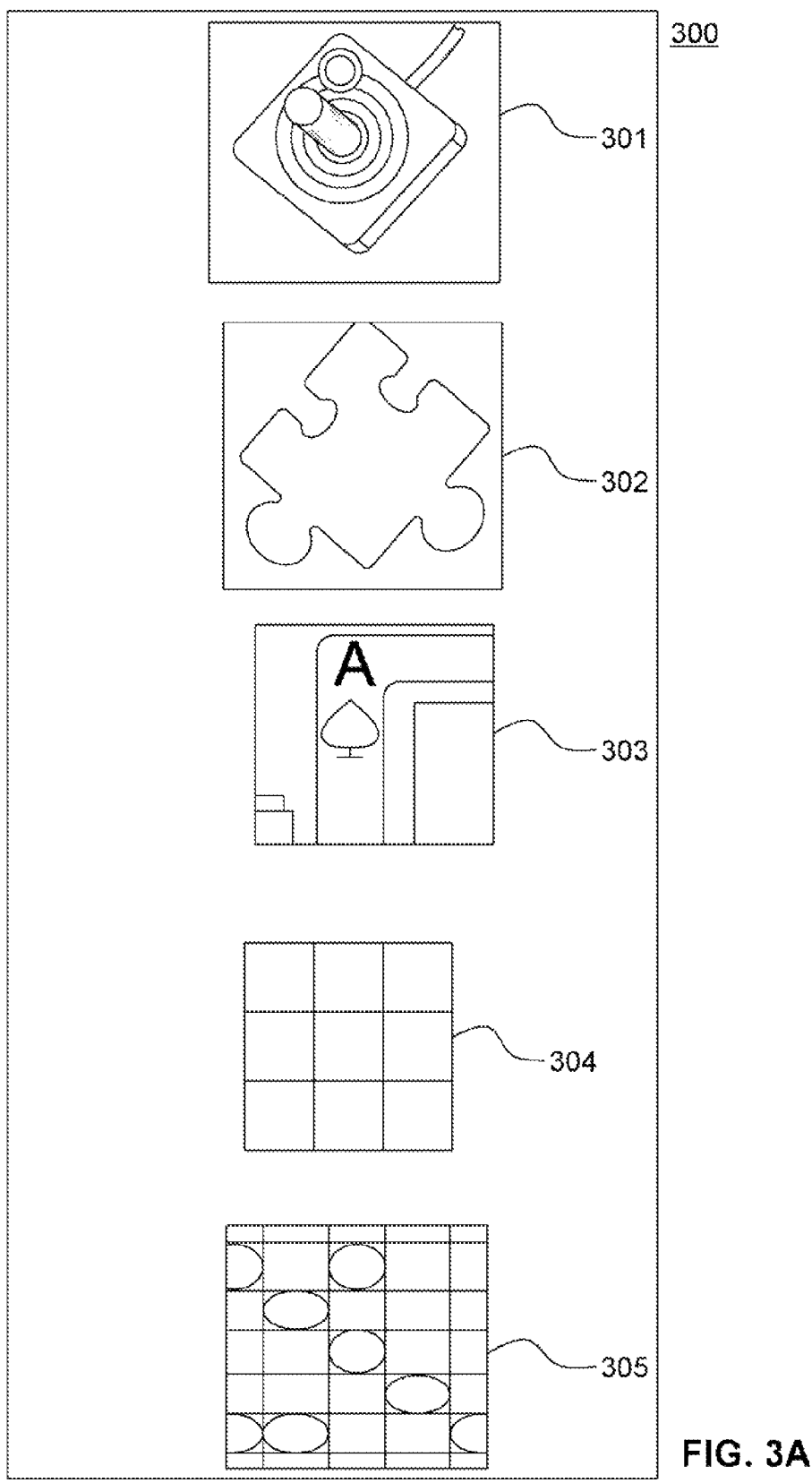
FIG. 3A illustrates a preview of a web page according to one embodiment of the present invention.

To help users to view the structure of the web page 200 better, the present invention may present a preview of the web page 200, fitted into one screen, when loading the web page 200. FIG. 3A illustrates a preview of a web page according to one embodiment of the present invention. As shown, the preview 300 may be a smaller version of the web page 200. In one embodiment, the preview 300 may include small representations 301 (arcade games), 302 (puzzle games), 303 (card games), 304 (word games) and 305 (board games), each of which may be a smaller version of the visual representation of a respective module of the web page 200. The small representations may be arranged in the same way the modules are arranged on the web page 200. The preview 300 may provide to users an overall image of content on the web page 200 before they actually scroll up and down the web page. Although only the first module and part of the second module may be shown on the screen, users may realize that there are three other modules on the web page. Without the preview 300, users may only look at the first module and the second module, and miss the other three modules.

Through pattern recognition, users may get some ideas about the content of a module by looking at the smaller versions of visual representations of modules. In the embodiment shown in FIG. 3A, the visual representation of a module for a category of games includes an icon for this category, and so does the smaller version of the visual representation of the module. From there, the user may then decide whether to look at any of the modules in detail.

If a user is interested in the module for the category Arcade games, the user may cause his/her mouse cursor to hover over or click on the smaller version of the visual representation of the module for Arcade games. Consequently, the module for the category Arcade games may be loaded and displayed on the screen in full size first, while the loading and displaying of other modules may be delayed until the module for Arcade games is displayed.

Figure 3B:
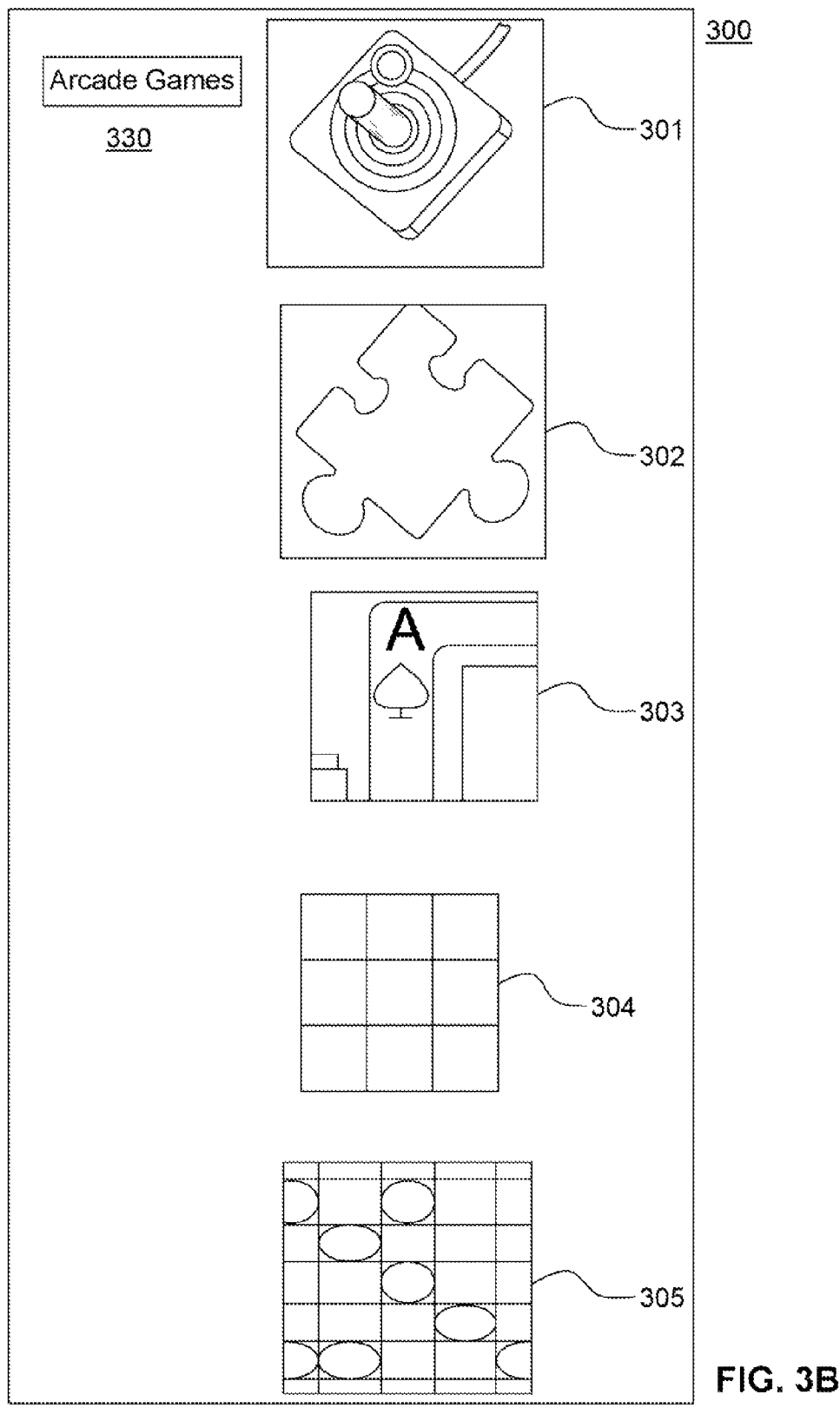
FIG. 3B illustrates a preview of a web page according to one embodiment of the present invention.

FIG. 3B illustrates a preview of a user interface according to one embodiment of the present invention. As shown, when a user's mouse cursor is hovering over a small representation of a module, e.g., the small representation 301, a text box 330 may be displayed at one side of the small representation, and the name of the module, "Arcade games", may be displayed in the text box. If the user confirms his/her interests in this module by continuing to have his/her mouse cursor hover over, or clicking on the small representation 301, the module for Arcade games may be loaded and displayed on the screen, earlier than other modules,. Otherwise, the text box 330 may continue to track the user's movements along the web page, and may change, for example, to "Puzzle games" when the user's mouse cursor hovers over visual representation 302, and so on.

Figure 4:
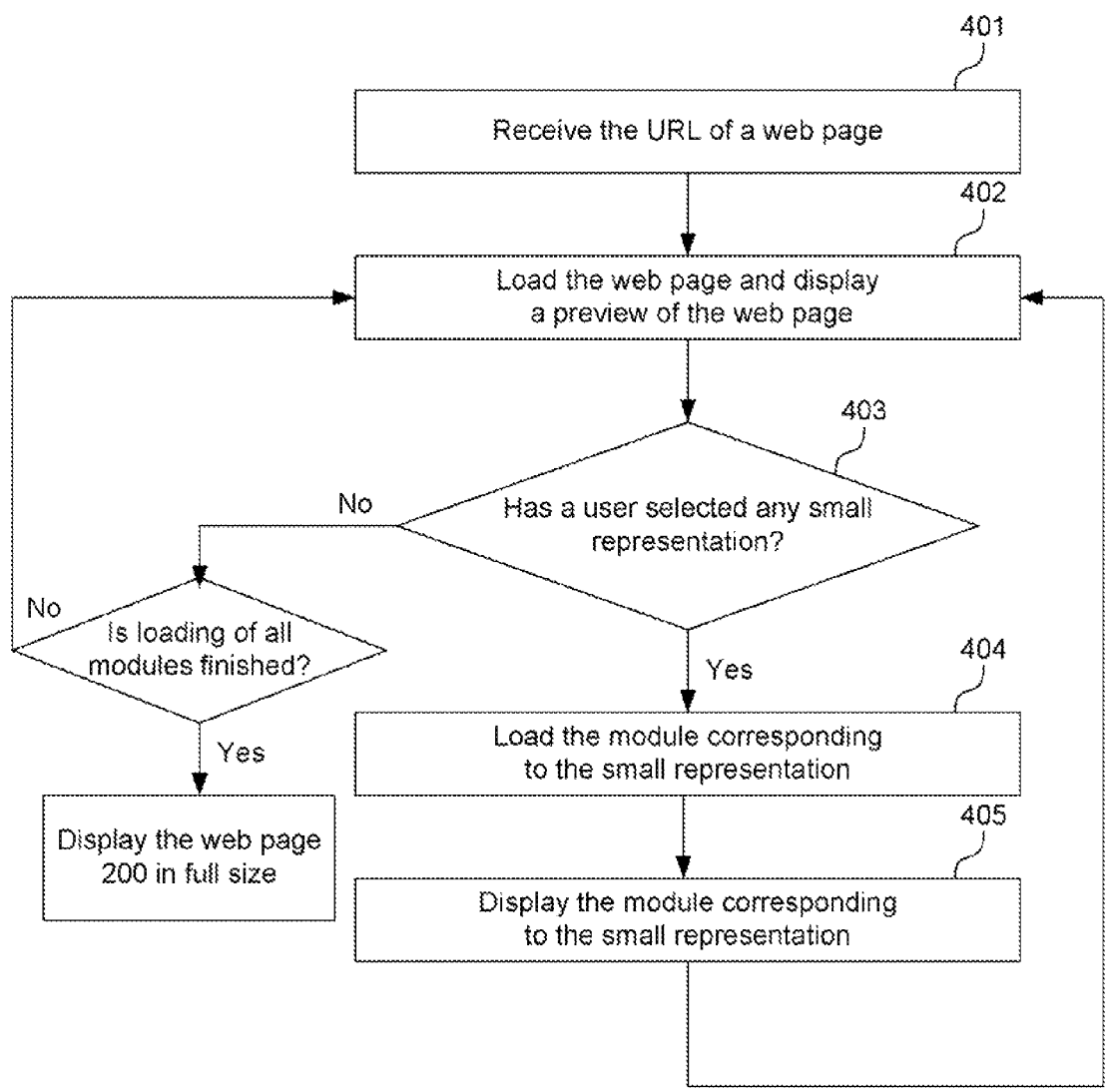
FIG. 4 illustrates a flowchart of a method for presenting a web page according to one embodiment of the present invention.

FIG. 4 illustrates a flowchart of a method for presenting a web page according to one embodiment of the present invention. The method shown in FIG. 4 may be used to present the web page shown in FIG. 2.

At 401, a URL (Uniform Resource Locator) of the web page 200 may be received by a browser program.

At 402, the loading of the web page 200 may begin, and the preview 300 of the web page 200 may be displayed on a screen. In one embodiment, the modules may be loaded one after another, in sequence. The loaded module and portion of a module may be displayed on the preview 300, in real time. In another embodiment, the five modules of the web page 200 may be loaded simultaneously, in parallel. The loaded portion of each module may be displayed on the preview 300, in real time. In one embodiment, the preview 300 may be displayed after the loading of all modules is finished.

At 403, it may be decided whether a user has selected any of the small representations on the preview 300. The user may select a small representation by hovering over the small representation or by clicking on the mini representation.

If the user has selected a small representation 301, the module for Arcade games may be loaded at 404, and displayed on the screen at 405, while the loading and displaying of other modules may be suspended. When the module for Arcade games is displayed on the screen, the process may return to 402 to load and display other modules.

In one embodiment, when the user is hovering over the small representation 301, a text box may be presented at one side of the small representation, with the name of the corresponding module, for example, Arcade games, being displayed in the text box. If it is decided that the user continues to cause his/her mouse cursor to hover over the small representation, or has clicked on the small representation, the process may proceed to 404. Otherwise, the process may return to 403.

If it is decided at 403 that the user has not selected any of the small representation on the preview 300, the process may proceed to 406. At 406, it may be decided whether the loading of all modules has been finished. If not, the process may return to 402. Otherwise, the preview 300 may be automatically expanded to the web page 200 in full size at 407. In one embodiment, the expanding may be delayed for a predetermined period of time, e.g., 1 second, so that the user may have more time to look at the preview 300.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method comprising:
    receiving a URL (Uniform Resource Locator) of a web page, wherein the web page comprises at least two modules which, when displayed together, fills more than 100% of a screen at a user terminal;
    loading the at least two modules of the web page at the user terminal;
    during said loading of the at least two modules of the web page at the user terminal, displaying a preview of the web page, wherein the preview comprises a small representation of each of the modules and is fitted into one screen at the user terminal, wherein the web page including the at least two modules is operable to be displayed in a full size at the user terminal upon completion of said loading of the at least two modules; and
    during said loading of the at least two modules of the web page at the user terminal, expanding at least a user-selected small representation to full size.

2. The method of claim 1, wherein the modules are loaded in parallel.

3. The method of claim 1, wherein the modules are loaded one after another.

4. The method of claim 1, wherein a loaded portion of a module is displayed on the preview in real time.

5. The method of claim 1, wherein the preview is continued to be displayed when all modules are loaded.

6. The method of claim 1, further comprising:
    determining whether a small representation has been selected.

7. The method of claim 1, further comprising:
    when a user has selected the small representation and prior to said expanding at least the user-selected small representation, loading a module corresponding to the user-selected small representation while suspending loading of another module; and
    resuming loading of the another module after said expanding the at least the user-selected small representation.

8. The method of claim 1, further comprising:
    displaying the name of a module on one side of its small representation.

9. The method of claim 1, further comprising:
    displaying the webpage, wherein displaying the web page comprises automatically expanding the preview to the web page in full size when all modules are loaded.

10. The method of claim 1, further comprising:
    displaying the webpage, wherein displaying the web page comprises automatically expanding the preview to the web page in full size after a predetermined period of time from completion of loading of all modules.

11. A computer program product comprising a computer-readable medium containing program code for performing the method of claim 1.

12. A non-transitory computer program product comprising a computer-readable medium containing program code means embodied in said medium for presenting a web page, the computer program product comprising:

a first computer readable program code means for enabling a microprocessor to receive a URL (Uniform Resource Locator) of a web page, the web page comprising at least two modules which, when displayed together, fill more than 100% of a screen at a user terminal;

a second computer readable program code means for enabling a microprocessor to load the at least two modules of the web page at the user terminal;

a third computer readable program code means for enabling a microprocessor to display a preview of the web page during loading of the at least two modules of the web page at the user terminal, the preview comprising a small representation of each of the modules and is fitted into one screen at the user terminal, wherein the web page including the at least two modules is operable to be displayed in a full size at the user terminal upon completion of loading of the at least two modules; and a fourth computer readable program code means for enabling a microprocessor to expand at least a user-selected small representation to full size during loading of the at least two modules of the web page at the user terminal.

13. The computer program product of claim 12, the computer program product comprising:

a fifth computer readable program code means for enabling a microprocessor to load a module when a user has selected the small representation and prior to expanding at least the user-selected small representation, the module corresponding to the user-selected small representation, loading of the module performed while suspending loading of another module; and a sixth computer readable program code means for enabling a microprocessor to resume loading of the another module after expanding at least the user-selected small representation.

14. The computer program product of claim 12, wherein the preview is continued to be displayed when all modules are loaded.

15. The computer program product of claim 12, wherein a loaded portion of a module is displayed on the preview in real time.

16. The computer program product of claim 12, the computer program product comprising:

a sixth computer readable program code means for enabling a microprocessor to automatically expand the preview to the web page in full size when all modules are loaded.

17. A system able to receive and display web pages on a screen, the system comprising:

at least one microprocessor;

a first program module implemented at least partially by the at least one microprocessor that is configured to receive a URL (Uniform Resource Locator) of a web page, the web page comprising at least two modules which, when displayed together, fill more than 100% of a screen at a user terminal;

a second program module configured to load the at least two modules of the web page at the user terminal;

a third program module configured to display a preview of the web page during loading of the at least two modules of the web page at the user terminal, the preview comprising a small representation of each of the modules and is fitted into one screen at the user terminal, wherein the web page including the at least two modules is operable to be displayed in a full size at the user terminal upon completion of loading of the at least two modules; and a fourth program module configured to expand at least a user-selected small representation to full size during loading of the at least two modules of the web page at the user terminal.

18. The system of claim 17, wherein a loaded portion of a module is displayed on the preview in real time.

19. The system of claim 17, further comprising:

a fifth program module configured to load a module when a user has selected the small representation and prior to expanding at least the user-selected small representation, the module corresponding to the selected small representation, loading of the module performed while suspending loading of another module; and a sixth program module configured to resume loading the another module after expanding at least the user-selected small representation.

20. The system of claim 17, further comprising:

a fifth program module configured to expand the preview to the web page in full size when all modules are loaded.

* * * * *